United States Patent [19]

Seino et al.

[11] 3,800,625

[45] Apr. 2, 1974

[54] INTERNAL COMBUSTION ENGINES OF RECIPROCATING PISTON TYPE

[75] Inventors: Tetsuya Seino; Mitsuo Nagahama; Kengo Nishi, all of Shizuoka, Japan

[73] Assignee: Yamaha Hatsudoki Kabushiki Kaisha, Shingai, Iwata, Shizuoka, Japan

[22] Filed: May 29, 1973

[21] Appl. No.: 364,730

[52] U.S. Cl. .............................. 74/604, 123/192 B
[51] Int. Cl. ............................................. F16f 15/10
[58] Field of Search ........ 74/604; 123/192 B, 192 R

[56] References Cited
UNITED STATES PATENTS 3,667,317  6/1972  Hillingrathner ...................... 74/604

FOREIGN PATENTS OR APPLICATIONS 1,920,569  11/1970  Germany ........................ 123/192 B Primary Examiner—Benjamin W. Wyche
Assistant Examiner—F. D. Shoemaker
Attorney, Agent, or Firm—Spensley, Horn and Lubitz

[57] ABSTRACT

The present invention relates to a reciprocating piston type internal combustion engine, wherein the resultant of the vectors of inertia forces according to the rotation of the second and third balance weight means pass through the axis of the crank-shaft and equal in value and opposite in the direction to the resultant vector of primary inertia forces of the piston-crank mechanism and the transmission means is provided to rotate the second and third balance weights.

6 Claims, 3 Drawing Figures

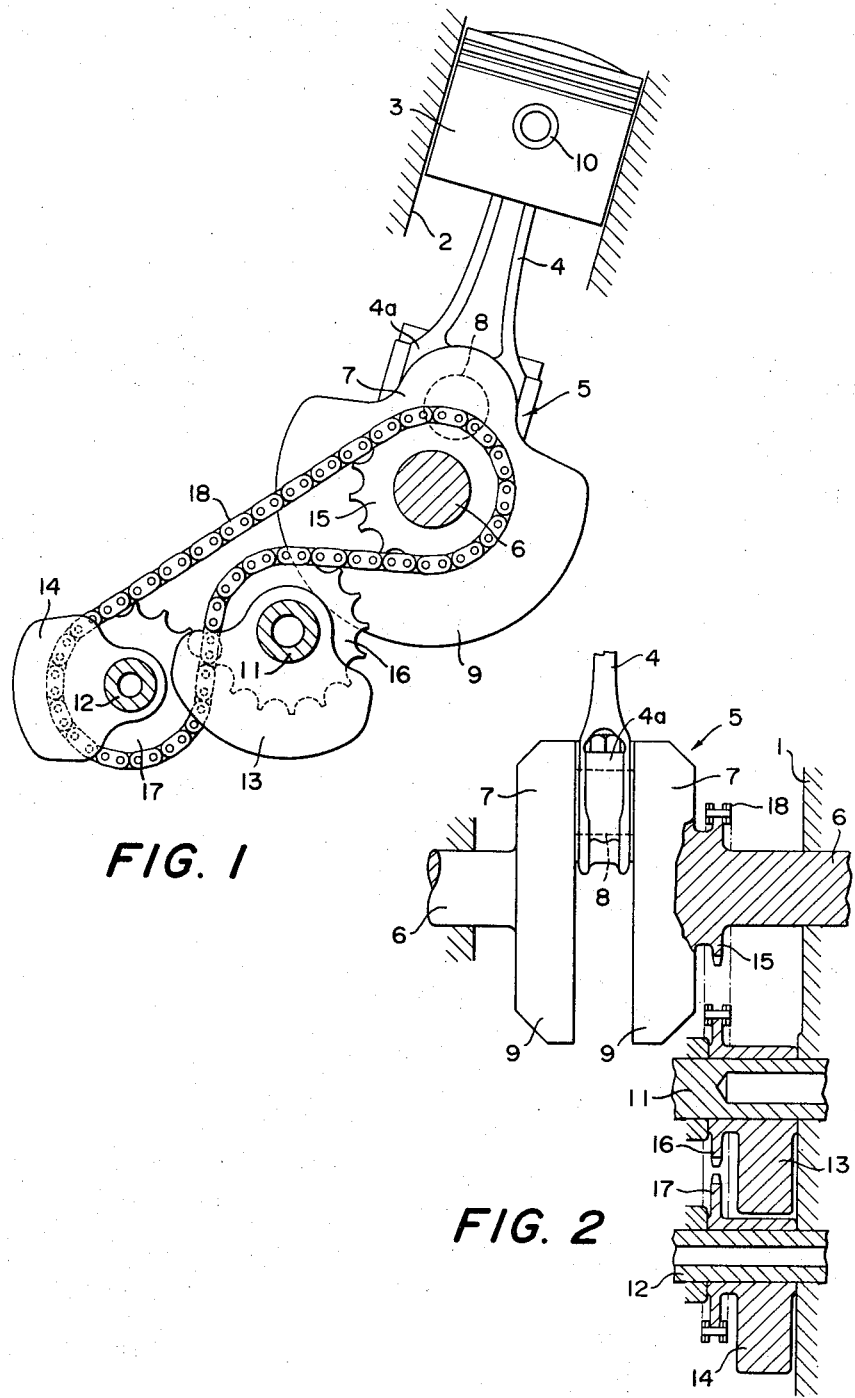

INTERNAL COMBUSTION ENGINES OF RECIPROCATING PISTON TYPE

FIELD OF INVENTION

This invention relates to a reciprocating piston type internal combustion engine having a piston-crank mechanism in which primary inertia force due to reciprocating mass and rotating mass can be perfectly balanced.

DESCRIPTION OF THE PRIOR ART

A conventional reciprocating type internal combustion engine comprises a piston disposed in a cylinder for reciprocatory movement therein and a rotatable crank-shaft disposed in a crankcase, which are connected with each other by a connecting rod, but such internal combustion engine is subject to a vibration due to the unbalance of the reciprocating mass and the rotating mass. In order to eliminate such unbalance vibration, various means have been proposed, but none of them has been entirely satisfactory with respect to its intended purpose, i.e., to completely avoid the vibration due to primary inertia force with a simple and practical construction.

For example, such internal combustion engine has been provided with a balance weight or rotating mass having half the value of a reciprocating mass connected to a crank-pin provided on a crank arm, and two other balance weights, of which the total mass is same as the mass of the firstmentioned balance weight, are respectively provided at the outside of each crank arm and coaxially to the crank journal so as to rotate at the same velocity as the crank shaft but in the opposite direction to the direction of rotation of said crank shaft. According to this balance weight construction, the primary inertia force can be balanced perfectly. In this prior art, it is necessary to dispose the balance weights at the opposite sides, respectively, of the crank arm coaxially with the crank journal, so that the degree of freedom in designs of engines is considerably restricted. Particularly, in a motor cycle, the engine is disposed at the position adjacent legs of a driver and therefore the disposing of a large space for the balance weights causes such disadvantages that the external appearance of the motorcycle is unsightly and the large space forms an obstruction to the legs of the driver.

SUMMARY OF INVENTION

The present invention has for its principal object the provision of a novel reciprocating piston type internal combustion engine which obviates the aforesaid drawback of the conventional reciprocating piston type engine and which is simple in construction and yet capable of effectively preventing the vibration due to the primary inertia force.

Another object of this present invention is to provide a novel reciprocating piston type engine with rotating balance weights, in which the positions of the axes of the balance weights can be rather freely selected in the course of the design.

According to one aspect of the invention, there is provided a piston-crank mechanism including a rotatable crank-shaft with first balance weight means, a piston and a connecting rod connecting the crank-shaft and the piston, while second and third balance weight means, which are opposite to each other in the sense of rotation thereof, are rotatably supported by the crank-case of the engine, and the resultant of the vectors of inertia forces due to the rotation of said second and third balance weight means always passes through the axis of the crank-shaft and is equal in value and opposite in sense to the resultant vector of inertia forces of the piston-crank mechanism.

BRIEF DESCRIPTION OF DRAWINGS

Other objects and the advantages of the present invention will be clear from hereinafter descriptions referring to the accompanying drawings, wherein:

FIG. 1 is a partially sectional view showing the balancing mechanism according to the present invention;

FIG. 2 is a sectional side view of the balancing mechanism shown in FIG. 1;

DETAILED DESCRIPTION OF AN EMBODIMENT OF INVENTION

Figure 3:
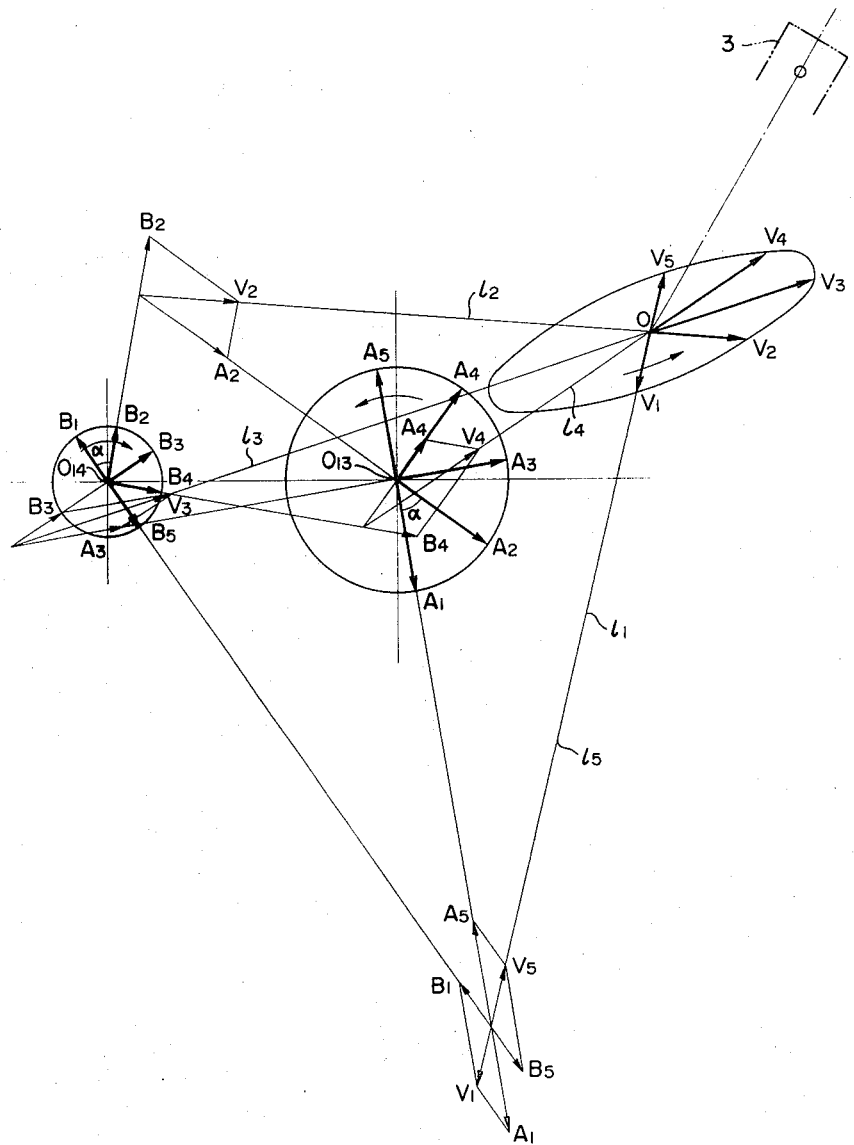
FIG. 3 is a vector diagram in the balancing mechanism shown in FIGS. 1 and 2.

Referring first to FIGS. 1 and 2, reference numeral 1 designates a crankcase, 2 a cylinder, 3 a piston which has a reciprocating motion within the cylinder 2, 4 a connecting rod and 5 a crank-shaft supported rotatably by the crankcase 1 at crank journals 6. The crank-shaft 5 comprises the crank journals 6, a pair of crank arms 7 integral with and extending at right angle from the crank journals 6, a crank-pin 8 fixed to the ends of the crank arms 7 remote from the crank journals 6 and a pair of first balance weights 9 fixed on the crank arms 7 on the side substantially opposite to the crank-pin 8 with respect to the crank journal 6. The large diameter end 4a of the connecting rod 4 is rotatably supported by the crank-pin 8, and the opposite end of the connecting rod 4 is pivoted to the piston pin 10 secured to the piston 3. The piston 3, the connecting rod 4 and the crank-shaft 5 constitute a conventional piston-crank mechanism.

In the present invention, second and third shafts or journals 11 and 12 in parallel to the crank-shaft 5 (and specifically journals 6) are provided in the crankcase 1. The second shaft 11 is provided with a second balance weight 13 and the third shaft 12 is provided with a third balance weight 14. In the embodiment shown in FIGS. 1 and 2, the second shaft 11 is disposed at the intermediate position between the crank journal 6 and the third shaft 12. In the case where there is a useful space at only one side of the crankcase 1, the above mentioned arrangement is desirable. A first, second and third sprocket wheels 15, 16 and 17 are secured on the crank journal 6, second balance weight 13 and third balance weight 14. These sprocket wheels 15, 16 and 17 have the same number of teeth. A driving chain 18 is engaged with the sprocket wheels 15, 16 and 17 in such a manner that the second balance weight 13 rotates at the same angular velocity as the crank shaft 5 but the rotating direction is opposite to the crank shaft 5 and the third balance weight 14 rotates at the same angular velocity and the same direction of the rotation as the crank shaft 5. The second and third shafts 11 and 12 for the second balance weight 13 and the third balance weight 14 can be omitted and a main shaft and a counter shaft each supporting gears in a transmission gear box can be used instead of said second and third shafts.

As well known, in the abovementioned piston-crank mechanism, the resultant vector of the primary inertia forces depending on the reciprocating mass and the rotating mass passes through the axis of the crank shaft. The locus of the end-point of the vector is a ellipse shape (including circular parts and linear parts) rotating at the opposite direction to that of the crank shaft. The directions of the long axis and the short axis of this ellipse and the ratio of the long and short diameters can be established owing to the angular position and the magnitude of the balance weight (corresponding to the first balance weight 9 in the embodiment illustrated in FIGS. 1 and 2) without any alteration in the design.

Now, in case the second and third balance weights 13 and 14 rotate at the same angular velocity and in the opposite directions to each other, vectors A and B and the resultant vector V of these vectors A and B are studied as undermentioned. In FIG. 3, $O_{13}$ and $O_{14}$ designate the centers of rotation of the balance weights 13 and 14. The vector of inertia force relating to the second balance weight 13 at the first angular position is designated with $A_1$ and the vector of inertia force relating to the third balance weight 14 is designated with $B_1$. The absolute values of the vectors $A_1$ and $B_1$ are proportioned to the mass of the balance weight 13 and the mass of the balance weight 14 respectively. The resultant vector $V_1$ of the vectors $A_1$ and $B_1$ can be obtained by the illustration. The absolute value, the line of action $l_1$ and a sense of $V_1$ are as illustrated in FIG. 3. At the angular position where the balance weights 13 and 14 are rotated from the original positions by the angle $\alpha$ (45°), the vectors $A_2$ and $B_2$ of inertia forces relating to the balance weights 13 and 14 rotate by the angle $\alpha$ in accordance with the rotations of the balance weights 13 and 14. The resultant vector $V_2$ of the vectors $A_2$ and $B_2$ can be obtained in the above manner as well as $V_1$. The absolute value, the line of action $l_2$ and a sense of $V_2$ are as illustrated in FIG. 3.

In the above manner, the resultant vectors $V_3$, $V_4$, $V_5$... at the third, fourth, fifth ... angular positions can be obtained. As clear from the illustration, the line of actions $l_1$, $l_2$, $l_3$ crosses to each other at a point 0. Plotting each end-point of the resultant vectors $V_1$, $V_2$ and $V_3$ forms a locus of ellipse rotating at the same direction as the vector A of inertia force generated by the second balance weight 13.

In the present invention, the axis of the crank shaft 6 is caused to be located in accord with the point 0 and the crank shaft 6 is rotated in the opposite direction to the vector V (as aforementioned, the vector of primary inertia force rotates in the opposite direction to the rotary direction of the crank shaft), i.e., in the same direction as the third balance weight 14 and the crank arm 7 is provided with the first balance weight 9. Further, the dimensions and/or the angular positions of the first, second and third balance weight 9, 13 and 14 are so suitably regulated that the resultant vector V and the resultant vector of the primary inertia force of the piston-crank mechanism are same as each other in the magnitude and the directions are opposite to each other. The regulations for the balance weights are possible and it is made as undermentioned.

The dimensions of the first balance weight and the angular position thereof to the crank arm 7 are so regulated (i.e., determined) that the directions of the long axis and the short axis of the ellipse obtained by displacement of the end-point of the resultant vector of primary inertia force of the piston-crank mechanism and the ratio of the long diameter to the short diameter are made to be in accord with those of the ellipse drawn by the end-point of the vector V. Then, the ellipse according to the vector V is extended or contracted in similar figures by increasing or reducing the dimensions of the second and third balance weights 13 and 14 in proportion to each other so that said both ellipses perfectly coincide with each other. Then, the resultant vector of the primary force of inertia in the piston-crank mechanism is made opposite to the resultant vector V by regulating the phase differences between the third balance weight 14 and the piston crank mechanism, wherein the above mentioned relationship between the second and third balance weights 13 and 14 is fixed. Thus, both resultant vectors always are equal to each other in the magnitude and are opposite to each other in the direction.

In FIG. 3, the values and phases of the second and third balance weights 13 and 14 have been selected suitably, and points 0, $O_{13}$ and $O_{14}$ substantially agree with the centers of the shafts 6, 11 and 12, respectively. However, the dispositions of points 0, $O_{13}$ and $O_{14}$ can be changed considerably by altering the values and the phases of the second and third balance weights 13 and 14. Accordingly, the dispositions of the shafts 6, 11 and 12 can be changed freely.

In the embodiment above explained, one second balance weight rotatable at the opposite direction to the rotating direction of the crank shaft 5 and one third balance weight 14 rotatable at the same direction as that of the crank shaft 5 are provided. In another embodiment according to the present invention, two or more second and third balance weights can be used. In this case, the resultant vectors of inertia forces according to the second balance weights may be used in place of the vector A and the resultant vectors of inertia forces according to the third balance weights may be used in place of the vector B.

We claim:

1. A reciprocating piston type internal combustion engine having a crankcase and a piston-crank mechanism including a crank-shaft rotatably being mounted in said crankcase and having a crank journal, a crank arm, a crank pin and first balance weight means provided on said crank arm on the side substantially opposite to said crank-pin with respect to said crank journal, a piston and a connecting rod having the opposite ends thereof rotatably connected to said crank-pin and said piston respectively, said engine comprising
   a. second balance weight means rotatably supported by said crankcase, the axis of rotation of said second balance weight means being parallel with that of said crank-shaft and the angular velocity of said second balance weight means being equal to that of said crank-shaft,
   b. third balance weight means rotatably supported by said crankcase, the axis of rotation of said third balance weight means being parallel with that of said crank-shaft, the angular velocity of said third balance weight means being equal to that of said crank-shaft and the sense of rotation of said third balance weight means being opposite to that of said second balance weight means, the resultant of the vectors of inertia forces due to the rotation of said second and third balance weight means passing through the axis of said crank-shaft and being equal in value and opposite in sense to the resultant vector of primary inertia forces of said piston-crank mechanism, and c. transmission means transmitting the rotation of said crank-shaft to said second and third balance weight means.

2. A reciprocating piston type internal combustion engine as claimed in claim 1, wherein said second balance weight means comprises a second balance weight supported by a second shaft secured to said crankcase, and said third balance weight means comprises a third balance weight supported by a third shaft secured to said crank-case.

3. A reciprocating piston type internal combustion engine as claimed in claim 1, wherein the axes of rotation of said second and third balance weight means are positioned substantially in the same side with respect to said crank-shaft.

4. A reciprocating piston type internal combustion engine as claimed in claim 3, wherein the axis of rotation of said second balance weight means is positioned substantially between those of said crank-shaft and third balance weight means.

5. A reciprocating piston type internal combustion engine as claimed in claim 4, wherein the sense of rotation of said second balance weight means is opposite to that of said crank-shaft and the sense of rotation of said third balance weight means is same as that of said crank-shaft.

6. A reciprocating piston type internal combustion engine as claimed in claim 1, wherein said transmission means comprises a first sprocket wheel fixed to said crank journal, a second sprocket wheel fixed to said second balance weight means, a third sprocket wheel fixed to said third balance weight means and a driving chain stretched between said three sprocket wheels.

* * * * *